(12) United States Patent
Mergener

(10) Patent No.: US 12,350,807 B2
(45) Date of Patent: ***Jul. 8, 2025

(54) UNIVERSAL PROTOCOL FOR POWER TOOLS

(71) Applicant: MILWAUKEE ELECTRIC TOOL CORPORATION, Brookfield, WI (US)

(72) Inventor: Matthew J. Mergener, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,164

(22) Filed: Nov. 17, 2023

(65) Prior Publication Data

US 2024/0086314 A1 Mar. 14, 2024

Related U.S. Application Data

(63) Continuation of application No. 17/817,598, filed on Aug. 4, 2022, now Pat. No. 11,874,766, which is a
(Continued)

(51) Int. Cl.
*G06F 9/445* (2018.01)
*B25F 5/00* (2006.01)
(Continued)

(52) U.S. Cl.
CPC ............... *B25F 5/00* (2013.01); *G06F 8/65* (2013.01); *G06F 9/44505* (2013.01);
(Continued)

(58) Field of Classification Search
CPC ... H04L 67/16; H04L 69/329; G05B 19/0428; G06F 11/0796
See application file for complete search history.

(56) References Cited

U.S. PATENT DOCUMENTS 3,626,545 A 12/1971 Sparrow
4,306,329 A 12/1981 Yokoi
(Continued)

FOREIGN PATENT DOCUMENTS

CA 2786726 A1 11/2005
CN 201086970 Y 7/2008
(Continued)

OTHER PUBLICATIONS

Instagram, Toolpig—Tools Carpentry Construction on Instagram, <https://www.instagram.com/p/BUchhjBgtmP/> published May 23, 2017, 1 page.
(Continued)

*Primary Examiner* — Barbara B Anyan
(74) *Attorney, Agent, or Firm* — Michael Best & Friedrich LLP

(57) ABSTRACT

A method for communicating between motorized power tools includes establishing, using a physical interface of a first power tool, a wireless radio link between the first power tool and a second power tool. The first power tool has a first motor and the second power tool has a second motor. A signal is received over the wireless radio link, via the physical interface, at the first power tool from the second power tool using a first wireless communication protocol. The signal includes an identifier. The second power tool is verified as authorized to send the signal to the first power tool based on the identifier. A tool component of the first power tool is controlled responsive to the signal.

20 Claims, 8 Drawing Sheets

Related U.S. Application Data continuation of application No. 16/856,425, filed on Apr. 23, 2020, now Pat. No. 11,409,647, which is a continuation of application No. 15/642,474, filed on Jul. 6, 2017, now Pat. No. 10,671,521, which is a continuation of application No. 15/249,961, filed on Aug. 29, 2016, now Pat. No. 9,710,373, which is a continuation of application No. 14/722,513, filed on May 27, 2015, now Pat. No. 9,430,370, which is a continuation of application No. 13/944,751, filed on Jul. 17, 2013, now Pat. No. 9,055,033.

(60) Provisional application No. 61/672,530, filed on Jul. 17, 2012.

(51) Int. Cl.
| | | |
|---|---|---|
| *G06F 8/65* | (2018.01) | |
| *G06F 12/02* | (2006.01) | |
| *H04L 67/12* | (2022.01) | |
| *H04L 67/51* | (2022.01) | |
| *H04L 69/00* | (2022.01) | |
| *H04L 69/08* | (2022.01) | |
| *G05B 9/02* | (2006.01) | |
| *G06F 11/07* | (2006.01) | |
| *G06F 13/40* | (2006.01) | |

(52) U.S. Cl.
CPC ............ *G06F 12/023* (2013.01); *H04L 67/12* (2013.01); *H04L 67/51* (2022.05); *H04L 69/03* (2013.01); *H04L 69/08* (2013.01); *G05B 9/02* (2013.01); *G05B 2219/25206* (2013.01); *G06F 11/0796* (2013.01); *G06F 13/409* (2013.01); *G06F 2212/251* (2013.01)

(56) References Cited

U.S. PATENT DOCUMENTS

| | | | |
|---|---|---|---|
| 5,120,983 A | 6/1992 | Sämann | |
| 5,256,906 A | 10/1993 | Tsuge et al. | |
| 5,274,878 A | 1/1994 | Radabaugh et al. | |
| 5,606,767 A | 3/1997 | Crlenjak et al. | |
| 5,709,007 A | 1/1998 | Chiang | |
| 5,839,156 A | 11/1998 | Park et al. | |
| 5,903,462 A | 5/1999 | Wagner et al. | |
| 5,991,885 A | 11/1999 | Chang et al. | |
| 6,044,519 A | 4/2000 | Hendrix | |
| 6,222,285 B1 | 4/2001 | Haley et al. | |
| 6,424,799 B1 | 7/2002 | Gilmore | |
| 6,536,536 B1 | 3/2003 | Gass et al. | |
| 6,607,041 B2 | 8/2003 | Suzuki et al. | |
| 6,615,930 B2 | 9/2003 | Bongers-Ambrosius et al. | |
| 6,675,196 B1* | 1/2004 | Kronz ................... H04L 67/16 | |
| | | | 709/200 |
| 6,834,730 B2 | 12/2004 | Gass et al. | |
| 6,836,614 B2 | 12/2004 | Gilmore | |
| 6,845,279 B1 | 1/2005 | Gilmore et al. | |
| 6,851,900 B2 | 2/2005 | Tillemans et al. | |
| 6,913,087 B1 | 7/2005 | Brotto et al. | |
| 6,967,972 B1 | 11/2005 | Volftsun et al. | |
| 7,036,605 B2 | 5/2006 | Suzuki et al. | |
| 7,036,703 B2 | 5/2006 | Grazioli et al. | |
| 7,040,972 B2 | 5/2006 | Hoffmann et al. | |
| 7,054,696 B2 | 5/2006 | Crowell | |
| 7,093,668 B2 | 8/2006 | Gass et al. | |
| 7,102,303 B2 | 9/2006 | Brotto | |
| 7,112,934 B2 | 9/2006 | Gilmore | |
| 7,121,358 B2 | 10/2006 | Gass et al. | |
| 7,243,152 B2* | 7/2007 | Guggisberg ...... H04L 29/12584 | |
| | | | 709/206 |
| 7,296,323 B2 | 11/2007 | Hayama et al. | |
| 7,298,240 B2 | 11/2007 | Lamar | |
| 7,328,752 B2 | 2/2008 | Gass et al. | |
| 7,330,129 B2 | 2/2008 | Crowell et al. | |
| 7,346,406 B2 | 3/2008 | Brotto et al. | |
| 7,346,422 B2 | 3/2008 | Tsuchiya et al. | |
| 7,391,326 B2 | 6/2008 | Puzio et al. | |
| 7,437,204 B2 | 10/2008 | Lev-Ami et al. | |
| 7,540,334 B2 | 6/2009 | Gass et al. | |
| 7,613,590 B2 | 11/2009 | Brown | |
| 7,646,155 B2 | 1/2010 | Woods et al. | |
| 7,688,028 B2 | 3/2010 | Phillips et al. | |
| 7,721,006 B2* | 5/2010 | Morrow ................. G06F 13/387 | |
| | | | 710/5 |
| 7,723,952 B2 | 5/2010 | Phillips et al. | |
| 7,750,811 B2 | 7/2010 | Puzio et al. | |
| 7,809,495 B2 | 10/2010 | Leufen | |
| 7,834,566 B2 | 11/2010 | Woods et al. | |
| 7,868,591 B2 | 1/2011 | Phillips et al. | |
| 7,896,098 B2 | 3/2011 | Suzuki et al. | |
| 7,928,673 B2 | 4/2011 | Woods et al. | |
| 7,953,965 B2 | 5/2011 | Qin et al. | |
| 8,004,664 B2 | 8/2011 | Etter et al. | |
| 8,005,647 B2 | 8/2011 | Armstrong et al. | |
| 8,169,298 B2 | 5/2012 | Wiesner et al. | |
| 8,210,275 B2 | 7/2012 | Suzuki et al. | |
| 8,294,424 B2 | 10/2012 | Bucur | |
| 8,310,206 B2 | 11/2012 | Bucur | |
| 8,443,485 B2 | 5/2013 | Kunz et al. | |
| 8,561,623 B2 | 10/2013 | Lowenstein | |
| 8,800,103 B2 | 8/2014 | Hong et al. | |
| 9,055,033 B2 | 6/2015 | Mergener | |
| 9,073,160 B2 | 7/2015 | Appel et al. | |
| 9,108,285 B2 | 8/2015 | Usselman | |
| 9,189,663 B2 | 11/2015 | Goren et al. | |
| 9,406,915 B2 | 8/2016 | White et al. | |
| 9,430,370 B2 | 8/2016 | Mergener | |
| 9,466,198 B2 | 10/2016 | Burch et al. | |
| 9,537,335 B2 | 1/2017 | Furui et al. | |
| 9,608,472 B2 | 3/2017 | Moshfeghi | |
| 9,652,217 B2 | 5/2017 | Winkler et al. | |
| 9,700,997 B2 | 7/2017 | Schlegel et al. | |
| 9,710,373 B2 | 7/2017 | Mergener | |
| 9,723,959 B2 | 8/2017 | Suzuki | |
| 9,756,402 B2 | 9/2017 | Stampfl et al. | |
| 9,906,045 B2 | 2/2018 | Kim et al. | |
| 9,916,739 B2 | 3/2018 | Suzuki | |
| 9,962,781 B2 | 5/2018 | Suzuki | |
| 10,039,137 B2 | 7/2018 | Nguyen | |
| 10,380,883 B2 | 8/2019 | Matson et al. | |
| 10,510,199 B2 | 12/2019 | Hoossainy et al. | |
| 10,646,982 B2 | 5/2020 | Dey, IV et al. | |
| 2001/0052416 A1 | 12/2001 | Wissmach et al. | |
| 2002/0143411 A1 | 10/2002 | Varone et al. | |
| 2002/0153855 A1 | 10/2002 | Song et al. | |
| 2003/0033686 A1 | 2/2003 | Liu | |
| 2003/0172310 A1* | 9/2003 | Moyer ................... G06F 1/3203 | |
| | | | 713/300 |
| 2004/0060145 A1 | 4/2004 | Hayama et al. | |
| 2004/0093682 A1 | 5/2004 | Litomisky et al. | |
| 2004/0199364 A1* | 10/2004 | Law ................... G05B 23/0256 | |
| | | | 702/189 |
| 2004/0213868 A1 | 10/2004 | Hinzpeter et al. | |
| 2005/0114718 A1* | 5/2005 | Ito ........................ G06F 13/409 | |
| | | | 713/300 |
| 2005/0195930 A1* | 9/2005 | Spital ..................... H04L 7/046 | |
| | | | 375/368 |
| 2005/0221739 A1 | 10/2005 | Hoffmann et al. | |
| 2005/0237189 A1 | 10/2005 | Tani | |
| 2005/0279213 A1 | 12/2005 | Otto | |
| 2006/0095158 A1 | 5/2006 | Lee et al. | |
| 2006/0261749 A1* | 11/2006 | Campbell ............ H02P 29/0241 | |
| | | | 315/291 |
| 2006/0293788 A1 | 12/2006 | Pogodin | |
| 2007/0283521 A1 | 12/2007 | Foster et al. | |
| 2008/0022479 A1 | 1/2008 | Zhao | |
| 2008/0287062 A1 | 11/2008 | Claus et al. | |
| 2009/0024757 A1* | 1/2009 | Proctor ................... H04L 69/18 | |
| | | | 709/232 |
| 2009/0058361 A1* | 3/2009 | John ....................... H02J 50/80 | |
| | | | 320/128 |

(56) References Cited

U.S. PATENT DOCUMENTS

| | | |
|---|---|---|
| 2009/0076656 A1 | 3/2009 | Lutz et al. |
| 2009/0217483 A1 | 9/2009 | Lee et al. |
| 2009/0241283 A1 | 10/2009 | Loveless et al. |
| 2009/0250364 A1 | 10/2009 | Gerold et al. |
| 2009/0251330 A1 | 10/2009 | Gerold et al. |
| 2009/0254203 A1 | 10/2009 | Gerold et al. |
| 2009/0327543 A1 | 12/2009 | Teggatz et al. |
| 2010/0096151 A1 | 4/2010 | Ostling |
| 2010/0176766 A1 | 7/2010 | Brandner et al. |
| 2010/0199453 A1 | 8/2010 | Brotto et al. |
| 2011/0015764 A1 | 1/2011 | Chen et al. |
| 2011/0056716 A1 | 3/2011 | Jonsson et al. |
| 2011/0073343 A1 | 3/2011 | Sawano et al. |
| 2011/0114345 A1 | 5/2011 | Schlesak et al. |
| 2012/0073077 A1 | 3/2012 | Ishikawa et al. |
| 2012/0083298 A1 | 4/2012 | Park et al. |
| 2012/0100803 A1 | 4/2012 | Suumäki et al. |
| 2012/0104991 A1 | 5/2012 | Suzuki et al. |
| 2012/0187851 A1 | 7/2012 | Huggins et al. |
| 2012/0238119 A1 | 9/2012 | Rejman et al. |
| 2012/0302101 A1 | 11/2012 | Brotto et al. |
| 2012/0312570 A1 | 12/2012 | Wanek et al. |
| 2012/0325507 A1 | 12/2012 | Fluhrer et al. |
| 2013/0005246 A1 | 1/2013 | Waters et al. |
| 2013/0068255 A1 | 3/2013 | Heger |
| 2013/0241699 A1* | 9/2013 | Covaro .............. G06K 7/10009 340/10.1 |
| 2013/0257360 A1* | 10/2013 | Singh ...................... H02J 50/60 320/108 |
| 2013/0288599 A1 | 10/2013 | Bernard et al. |
| 2013/0331973 A1 | 12/2013 | Clark et al. |
| 2014/0008087 A1 | 1/2014 | Brown et al. |
| 2014/0025834 A1 | 1/2014 | Mergener |
| 2014/0107853 A1 | 4/2014 | Ashinghurst et al. |
| 2014/0151079 A1 | 6/2014 | Furui et al. |
| 2014/0158389 A1 | 6/2014 | Ito et al. |
| 2014/0191664 A1 | 7/2014 | Johnson et al. |
| 2014/0213179 A1 | 7/2014 | Rosenberg |
| 2014/0237753 A1 | 8/2014 | Conrad |
| 2014/0261551 A1 | 9/2014 | Usselman |
| 2014/0304939 A1 | 10/2014 | Suzuki |
| 2014/0315487 A1 | 10/2014 | Lu |
| 2014/0337952 A1 | 11/2014 | Bahr et al. |
| 2015/0070142 A1 | 3/2015 | Miki et al. |
| 2015/0162646 A1 | 6/2015 | Kawase et al. |
| 2015/0239086 A1 | 8/2015 | Lee |
| 2016/0049697 A1 | 2/2016 | McGee |
| 2016/0085253 A1 | 3/2016 | Knight et al. |
| 2016/0094080 A1 | 3/2016 | Dong |
| 2016/0100724 A1 | 4/2016 | Valentini |
| 2016/0151846 A1 | 6/2016 | Suzuki |
| 2016/0175895 A1 | 6/2016 | Suzuki |
| 2016/0311094 A1 | 10/2016 | Mergener et al. |
| 2016/0342142 A1 | 11/2016 | Boeck et al. |
| 2016/0367266 A1 | 12/2016 | Palmerton et al. |
| 2017/0057040 A1 | 3/2017 | Rzasa et al. |
| 2017/0153631 A1 | 6/2017 | Jonsson |
| 2017/0193761 A1 | 7/2017 | Suzuki |
| 2017/0201853 A1 | 7/2017 | Chen et al. |
| 2017/0201886 A1 | 7/2017 | Yang et al. |
| 2017/0257472 A1 | 9/2017 | Gehring et al. |
| 2017/0300406 A1 | 10/2017 | Mergener |
| 2017/0326696 A1 | 11/2017 | Halverson |
| 2018/0126537 A1 | 5/2018 | Tanaka et al. |
| 2018/0229317 A1 | 8/2018 | Suzuki |
| 2019/0011892 A1 | 1/2019 | Post et al. |
| 2019/0022775 A1 | 1/2019 | Suzuki |
| 2019/0067756 A1 | 2/2019 | Lee et al. |
| 2019/0097469 A1 | 3/2019 | Watanabe |

FOREIGN PATENT DOCUMENTS

| | | |
|---|---|---|
| CN | 101234012 A | 8/2008 |
| CN | 101866169 A | 10/2010 |
| CN | 102490172 A | 6/2012 |
| CN | 203042139 U | 7/2013 |
| CN | 104076700 A | 10/2014 |
| CN | 204241870 U | 4/2015 |
| CN | 106385661 A | 2/2017 |
| CN | 106909156 A | 6/2017 |
| DE | 8808570 U1 | 10/1988 |
| DE | 102012003073 A1 | 8/2013 |
| DE | 102012003077 A1 | 8/2013 |
| DE | 102013222313 A1 | 5/2015 |
| DE | 202017104107 A1 | 7/2017 |
| EP | 0371236 A2 | 6/1990 |
| EP | 1016946 B1 | 5/2006 |
| EP | 2229857 A2 | 9/2010 |
| EP | 2233993 A1 | 9/2010 |
| EP | 2628427 A2 | 8/2013 |
| EP | 2628428 A2 | 8/2013 |
| EP | 2628431 A2 | 8/2013 |
| EP | 2687331 A1 | 1/2014 |
| EP | 2878249 A1 | 6/2015 |
| EP | 2946710 A2 | 11/2015 |
| EP | 2962813 A1 | 1/2016 |
| EP | 3159114 A1 | 4/2017 |
| EP | 3272261 A2 | 1/2018 |
| EP | 3272467 A2 | 1/2018 |
| EP | 3415066 A1 | 12/2018 |
| EP | 3528213 A1 | 8/2019 |
| JP | H07222756 A | 8/1995 |
| JP | 2001137158 A | 5/2001 |
| JP | 2001161607 A | 6/2001 |
| JP | 2002209818 A | 7/2002 |
| JP | 2002224631 A | 8/2002 |
| JP | 2005102791 A | 4/2005 |
| JP | 2007063846 A | 3/2007 |
| JP | 2007301344 A | 11/2007 |
| JP | 2008000739 A | 1/2008 |
| JP | 2008220567 A | 9/2008 |
| JP | 2009083043 | 4/2009 |
| JP | 4550357 B2 | 9/2010 |
| JP | 2011079082 A | 4/2011 |
| JP | 4955332 B2 | 6/2012 |
| JP | 2014057635 A | 4/2014 |
| JP | 2014525840 A | 10/2014 |
| JP | 5828110 B2 | 12/2015 |
| JP | 2016209997 A | 12/2016 |
| JP | 2018069445 A | 5/2018 |
| KR | 0175512 B1 | 2/1999 |
| KR | 200321249 Y1 | 7/2003 |
| KR | 100725516 B1 | 6/2007 |
| KR | 100833125 B1 | 5/2008 |
| WO | WO2004010253 A2 | 1/2004 |
| WO | WO2007090258 A1 | 8/2007 |
| WO | WO2008064952 A1 | 6/2008 |
| WO | WO2010085637 A1 | 7/2010 |
| WO | WO2011115121 A1 | 9/2011 |
| WO | WO2012027739 A2 | 3/2012 |
| WO | WO2012031925 A1 | 3/2012 |
| WO | WO2012061673 A2 | 5/2012 |
| WO | WO2015162193 A1 | 10/2015 |
| WO | WO2017075547 A1 | 5/2017 |
| WO | WO2017171609 A1 | 10/2017 |
| WO | WO2018162233 A1 | 9/2018 |
| WO | WO2018177623 A1 | 10/2018 |
| WO | WO2018180896 A1 | 10/2018 |

OTHER PUBLICATIONS

Instagram, Toolpig—Tools Carpentry Construction on Instagram, <https://www.instagram.com/p/BUR9YHFgr3N/?hl=en> published May 19, 2017, 1 page.

Makita, Auto-Start Wireless System, <https://www.makitatools.com/aws>, 2018 [website accessed Jan. 25, 2018] 6 pages.

Makita, Makita Tools 2017 New Product Launch Event, <http://www.coptool.com/makita-2017-new-products-event/> published May 22, 2017, 14 pages.

Toolguyd, New Makita 18V X2 Brushless Miter Saw with Remote Dust Vac Trigger, <https://toolguyd.com/makita-18v-x2-brushless-

(56) References Cited

OTHER PUBLICATIONS miter-saw-xsl06-with-bluetooth-dust-collection-activation/> published May 24, 2017, 15 pages.
Youtube, Coptool—Makita 18v Lxt X2 Brushless 10" Miter Saw XSL06 & Corded LS1019L, <https://www.youtube.com/watch?v=-lqr26tB6Fg> published May 22, 2017, 9 pages.
International Search Report and Written Opinion for Application No. PCT/US2013/050946 dated Jan. 22, 2014 (9 pages).
German Patent Office Action for Application No. 112013003581.2 with English Translation dated Apr. 10, 2017 (15 pages).
International Search Report and Written Opinion for Application No. PCT/US2018/028072 dated Aug. 6, 2018, 12 pages.
United States Patent Office Final Rejection for U.S. Appl. No. 15/955,915 dated Dec. 21, 2018, 44 pages.
Taiwan Patent Office Action for Application No. 10820388720 dated Apr. 29, 2019, 14 pages.
Chiueh et al., "A Networked Robot System for Wireless Network Emulation." In Proceedings of the 1st international conference on Robot communication and coordination, IEEE Press, 2007, 8 pages.
Domnitcheva, "Smart Vacuum Cleaner—An Autonomous Location-Aware Cleaning Device." In Proceedings of the 6th International Conference on Ubiquitous Computing, Tokyo, Japan, 2004, 2 pages.
Infinity Cutting Tools, "iVac Automated Dust Collection-Carbide Router Bits." <https://www.infinitytools.com/iVac-Automated-Dust-Collection/departments/1789/> webpage available as early as Mar. 8, 2013, 2 pages.
Mbright Tools, "Ivac Pro User Guide." <https://web.archive.org/web/20110415084930/http://www.ivacswitch.com/default.action?itemid=25> webpage available as early as Apr. 15, 2011, 66 pages.
Mbright Tools, "Overview of the iVAC Pro System." <https://web.archive.org/web/20110415084949/http://www.ivacswitch.com/default.action?itemid=35> webpage available as early as Apr. 15, 2011, 1 page.
Bluetooth, "Specification of the Bluetooth System." Version 4.0 vol 0., published Jun. 30, 2010, 2302 pages.
European Patent Office Extended Search Report for Application No. 18190808.8 dated Jan. 18, 2019 (7 pages).
European Patent Office Extended Search Report for Application No. 19189302.2 dated Jan. 3, 2020 (8 pages).
United Kingdom Intellectual Property Office Examination Report for Application No. 1501111.7 dated Jan. 20, 2020 (3 pages).
Extended European Search Report for Application No. 18827650.5 dated Mar. 1, 2021 (8 pages).
Chinese Patent Office Action for Application No. 201880057781.4 dated Feb. 26, 2021 (11 pages including English summary).
Chinese Patent Office Action for Application No. 201880057781.4 dated Nov. 19, 2021 (6 pages including statement of relevance).

\* cited by examiner

UNIVERSAL PROTOCOL FOR POWER TOOLS

RELATED APPLICATIONS

This application is a continuation of U.S. patent application Ser. No. 17/817,598, filed Aug. 4, 2022, which is a continuation of U.S. patent application Ser. No. 16/856,425, filed Apr. 23, 2020, which is a continuation of U.S. patent application Ser. No. 15/642,474, filed Jul. 6, 2017, now U.S. Pat. No. 10,671,521, which is a continuation of U.S. patent application Ser. No. 15/249,961, filed Aug. 29, 2016, now U.S. Pat. No. 9,710,373, which is a continuation of U.S. patent application Ser. No. 14/722,513, filed May 27, 2015, now U.S. Pat. No. 9,430,370, which is a continuation of U.S. patent application Ser. No. 13/944,751, filed Jul. 17, 2013, now U.S. Pat. No. 9,055,033, which claims priority to U.S. Provisional Patent Application No. 61/672,530, filed Jul. 17, 2012, and the entire contents of all of which are incorporated herein by reference.

BACKGROUND

The present invention relates to communication protocols for power tools and other devices.

SUMMARY

A protocol is a set of rules defining how communications are to occur between two components. For instance, a protocol may define one or more of syntax, semantics, and synchronization rules for communications between components, including rules relating to data formats for data exchange, address formats for data exchange, address mapping, routing rules, detection/correction of transmission errors, acknowledgment messages, loss of information handling, direction and timing of information flow, sequence control, and flow control. The complexities of protocols selected for use in particular applications may vary.

Embodiments of the invention relate to a universal protocol for communicating with power tools to enable, for instance, the retrieval of performance data or the installation of firmware. Embodiments of the invention also relate to an interface module implementing a universal protocol that is used across a variety of power tools and other devices to enable communications with the power tools and other devices.

In one embodiment, the invention provides a method of implementing a universal protocol on a plurality of tools, the plurality of tools including a variety of power tool types. The method includes generating an interfacing module including a universal core module and an interface module, and then installing the interfacing module on a memory of each of the plurality of tools. The universal core module is used to implement the universal protocol and is generic to the plurality of tools. The universal core module includes a set of rules enabling interpretation and handling of communications that are in accordance with the universal protocol. The interface module is particular to each of the power tool types and is configured to translate communications on route to the universal core module to the universal protocol and to translate communications output by the universal core module from the universal protocol to another protocol.

In another embodiment, the invention provides a universal protocol system including a plurality of tools and an interfacing module. The plurality of tools includes a variety of power tool types, each tool including a memory. The interfacing module is installed on the memory of each tool and includes a universal core module and an interface module. The universal core module is used to implement a universal protocol and is generic to the plurality of tools. The universal core module also includes a set of rules enabling interpretation and handling of communications that are in accordance with the universal protocol. The interface module is particular to each of the power tool types. The interface module is configured to translate communications on route to the universal core module to the universal protocol and to translate communications output by the universal core module from the universal protocol to another protocol.

In yet another embodiment, the invention provides a method for communicating between power tools. The method includes establishing, using a physical interface of a first power tool, a wireless radio link between the first power tool and a second power tool. The first power tool has a first motor and the second power tool has a second motor. A signal is received over the wireless radio link, via the physical interface, at the first power tool from the second power tool using a first wireless communication protocol. The signal includes an identifier. The second power tool is verified as authorized to send the signal to the first power tool based on the identifier. A tool component of the first power tool is controlled responsive to the signal.

In a further embodiment, the invention provides a system for communicating messages, the system includes a first power tool and a second power tool. The first power tool includes a first motor and a first physical interface configured to transmit a signal over a wireless radio link. The signal includes an identifier. The second power tool includes a tool component, a second physical interface configured to receive the signal over the wireless radio link, and a controller. The controller is configured to verify the first power tool is authorized to send the signal to the second power tool based on the identifier and control the tool component responsive to the signal.

In some embodiments of the method and system, the variety of power tool types include tools having various power platforms. For instance, in some embodiments, the variety of power tool types includes tools powered by at least an AC power source and a DC power source. Additionally, in some embodiments, the variety of power tool types includes tools powered by at least two of a 4 volt battery pack, a 12 volt battery pack, an 18 volt battery pack, a 28 volt battery pack, and a 36 volt battery pack. Thus, the universal core module is generic to the plurality of tools having a plurality of power platforms.

Other aspects of the invention will become apparent by consideration of the detailed description and accompanying drawings.

DETAILED DESCRIPTION

Figure 1A:
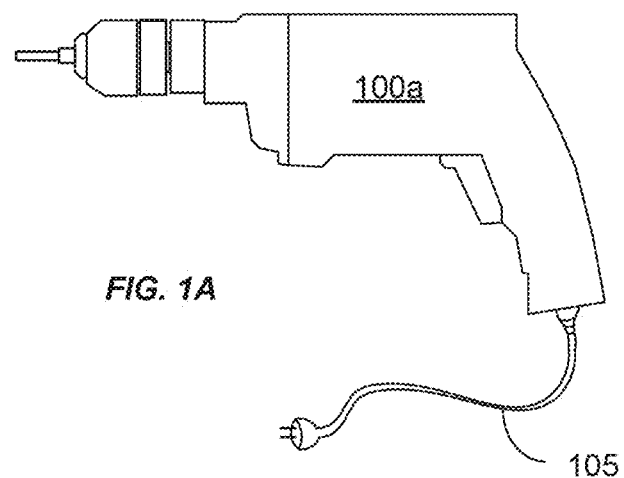
FIGS. 1A-B illustrate tools incorporating a universal protocol according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components. In some instances, the controllers described in the specification may be implemented in one of or a combination of a general processor, an application specific integrated circuit (ASIC), a digital signal processor (DSP), a field programmable gate array (FPGA), or the like.

Figure 1B:
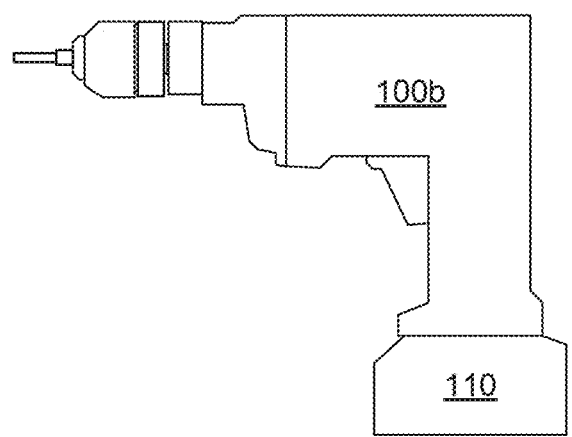
Figure 1C:
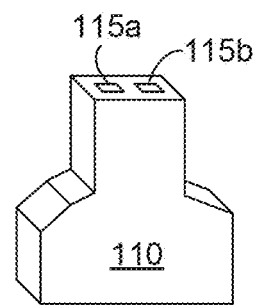
FIG. 1C illustrates a battery for powering the tool of FIG. 1B.

FIGS. 1A and 1B each illustrate a power tool 100 incorporating a universal protocol according to embodiments of the invention. The power tool 100a of FIG. 1A is an AC powered tool that receives power from an AC source (not shown), such as a standard 120 V/60 Hz source, via power cord 105. Power tool 100b of FIG. 1B is a DC powered tool that receives power from a DC battery 110. As shown in FIG. 1C, the battery 110 includes two terminals 115, a positive terminal 115a, and a negative terminal 115b, for interfacing with the power tool 100b. Although not shown, the power tool 100b has complimentary terminals for forming a connection with the terminals 115 when the battery 110 is inserted into the power tool 100b. In some instances, additional terminals are provided for duplicating connection points and/or for providing separate communication paths for the power tool 100b to communicate with internal components of the battery 110. The battery 110 is a tower-style battery that may include a latching mechanism to ensure that the battery 110 remains coupled to the power tool 100b during operation. In some embodiments, the battery 110 does not include a vertical tower but, rather, has an alternate battery configuration, such as for slidingly engaging the power tool 100b via a horizontal rail and groove arrangement.

Figure 2:
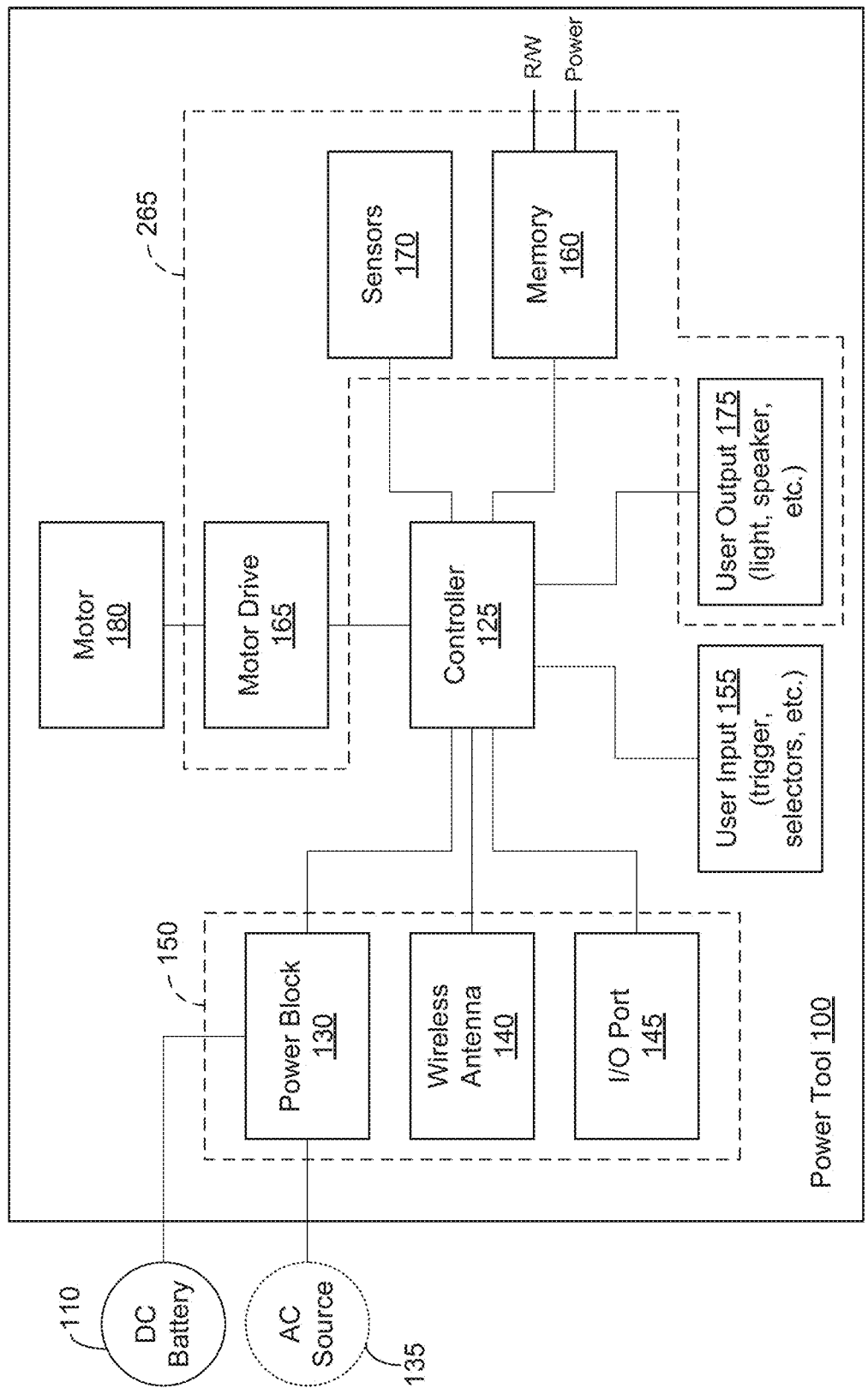
FIG. 2 illustrates a controller of a tool incorporating the universal protocol.

FIG. 2 illustrates a block diagram of the power tool 100. The power tool 100 includes a controller 125 in communication with and receiving power from a power block 130. In the battery-powered power tool 100b, the power block 130 is coupled to the battery 110 via the terminals 115 of the battery 110 and matching terminals (not shown) of the power block 130. In the AC-powered power tool 100a, an AC source 135 is coupled to the power block 130, rather than the DC battery 110. The power block 130 may further include power regulating and conversion circuitry to ensure that the power provided to various components of the power tool 100a and 100b is at the appropriate level(s).

The controller 125 is further coupled to a wireless antenna 140 and an input/output (I/O) port 145. As will be described in greater detail below, the power block 130, wireless antenna 140, and I/O port 145 enable the tool 100b to communicate with external devices and are collectively referred to as the physical interface 150.

The controller 125 is also coupled to user input 155, which may include one or more of an actuating device (e.g., a trigger, button, etc.), one or more selectors (e.g., a forward/reverse selector, light control, etc.), and other input elements (speed level, torque, level, etc.) to provide user commands to the controller to indicate how the user desires the power tool 100 to operate.

The controller 125 is coupled to a memory 160. The memory 160 includes, among other elements, software that is executed by a processing unit of the controller 125 to control the functions of the tool 100 described herein. The controller 125 is further coupled to a motor drive 165, sensors 170, and user output 175. The controller 125 provides control signals to the motor drive 165 such that the motor drive 165 selectively enables power from one of the AC power source 135 and the battery 110 to drive the motor 180. The control signals to operate the motor drive 165 are generated based on (a) signals received by the controller 125 from the user input 155 and the sensors 170 and (b) software and parameters received and executed by the controller 125 from the memory 160. The motor 180 may be one of a brushless motor and brushed motor.

The sensors 170 include one or more sensors for detecting various operating conditions of the tool 100, such as the temperature within the tool housing, the rotational position, speed, acceleration, and/or direction of the motor 180, vibrations, acceleration of the tool, the location of the tool, etc. For instance, the sensors 170 may include one or more hall sensors for monitoring the position, speed, acceleration, and/or direction of the motor 180. The controller 125 may receive the outputs of the hall sensors to properly time commutation control signals of the motor drive 165. In some instances, the motor drive 165 may directly receive the hall sensors' outputs to control timing of the commutation of the motor 180. The user output 175 includes one or more of LEDs, a speaker, a vibrating element, etc. to inform the user of the status of the tool 100. For instance, if an error occurs, such as low battery power, the tool 100 may output an audible alert, an LED may flash, and/or the vibrating element may provide tactile feedback to the user. Additionally, the controller 125 may selectively activate and deactivate one or more LEDs that provide illumination of a working area. In some instances, the sensors 170 include a global positioning satellite (GPS) module to provide a location of the tool 100 or a strength-of-signal sensor in wireless communication with another wireless device, such as a fixed wireless unit at a known position, to determine a relative location of the tool with respect to the wireless device.

Figure 3:
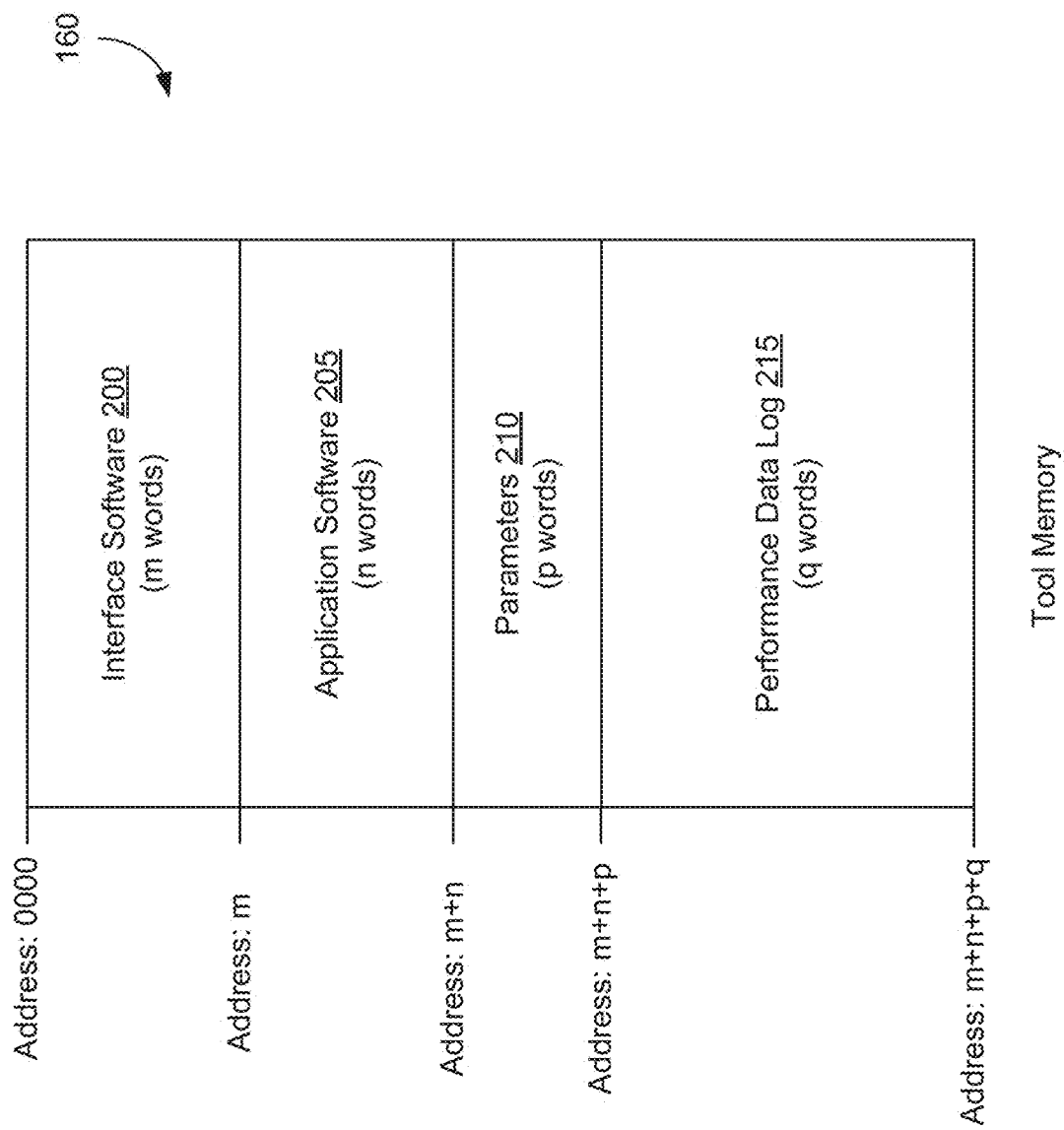
FIG. 3 illustrates a memory of a tool incorporating the universal protocol.

FIG. 3 illustrates the memory 160 in greater detail. The memory 160 is illustrated as word-addressable and contains interface software 200, application software 205, parameters 210, and performance data log 215. The application software 205 generally includes the instructions executed by the controller 125 to operate the power tool 100, for instance, to drive the motor in a selected direction based on depression of a trigger. The parameters 210 include stored values that effect the operation of the power tool 100. For instance, various torque, speed, and limit parameters may be stored in the parameters 210. During operation, the controller 125, based on instructions in the application software 205, may retrieve and use values stored in the parameters 210, which affect tool performance. The performance data log 215 stores performance data for the power tool 100. For instance, the performance data log 215 may include usage data for the motor 180, temperature of the power tool 100, error data, battery charge levels, battery current output levels, among other information and sensor data obtained by the controller 125. Usage data for the motor 180 may include motor rotational position, speed, acceleration, direction, temperature, current, etc.

Although the memory 160 is shown as a singular unit, the memory 160 may be made up of various memories individually coupled to the controller 125 or coupled to the controller 125 via a bus. Additionally, portions of the memory 160 may be embedded within the controller 125. For instance, the parameters 210 may be stored within a memory of the controller 125.

Figure 4:
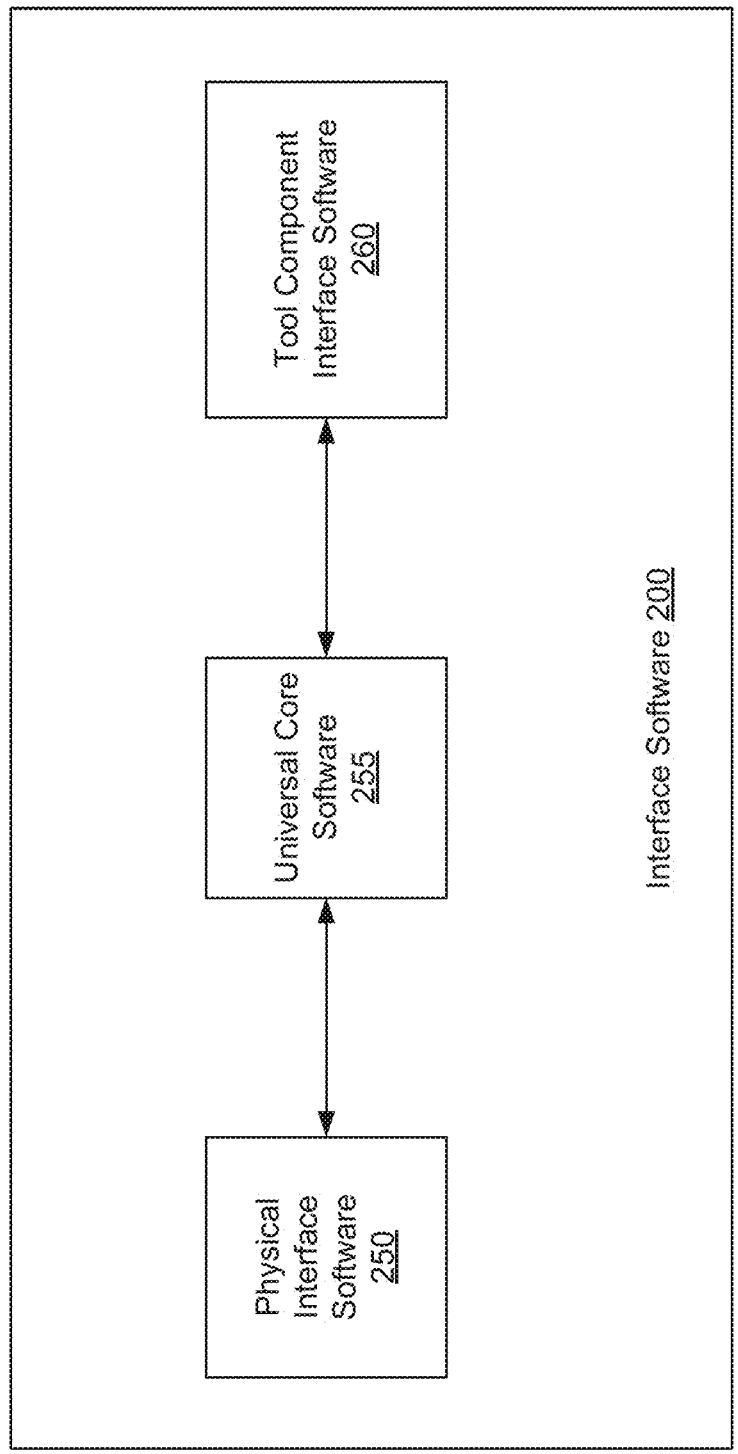
FIG. 4 illustrates interface software, including universal core software for implementing the universal protocol.

As shown in FIG. 4, the interface software 200 includes three main components: physical interface software 250, universal core software 255, and tool component interface software 260. The interface software 200 includes a set of instructions that enables the controller 125 to carry out commands provided by external devices. For example, the interface software 200 enables external devices to communicate with components of the tool 100, such as with tool components 265, including the memory 160, the sensors 170, the user output 175, and the motor drive 165 (see FIG. 2).

The physical interface software 250 includes translation software that enables the controller 125 to interpret signals received via the physical interface 150. For instance, the wireless antenna 140 may receive and send signals to the controller 125 according to a wireless protocol, and the I/O port 145 may receive and send signals to the controller 125 according to a different protocol. The physical interface software 250, however, enables the controller 125 to translate the signals received from the wireless antenna 140 and I/O port 145 to a universal protocol. The translated signals may include a combination of commands and data (collectively, the "universal protocol input"), which are handled by the controller 125 according to the universal core software 255.

The universal core software 255 includes a set of rules that enables the controller 125 to carry out the commands provided via the physical interface software 250 and tool component interface software 260. The universal core software 255 may also include a boot loader for the controller 125. Based on the universal protocol input and the rules of the universal core software 255, the universal core software 255 provides universal protocol output, i.e., commands and data according to the universal protocol, to the physical interface software 250 and to the tool component interface software 260, as appropriate for a particular situation. The tool component interface software 260 translates the universal protocol output to one or more protocols used to interact with the various tool components 265.

Figure 5A:
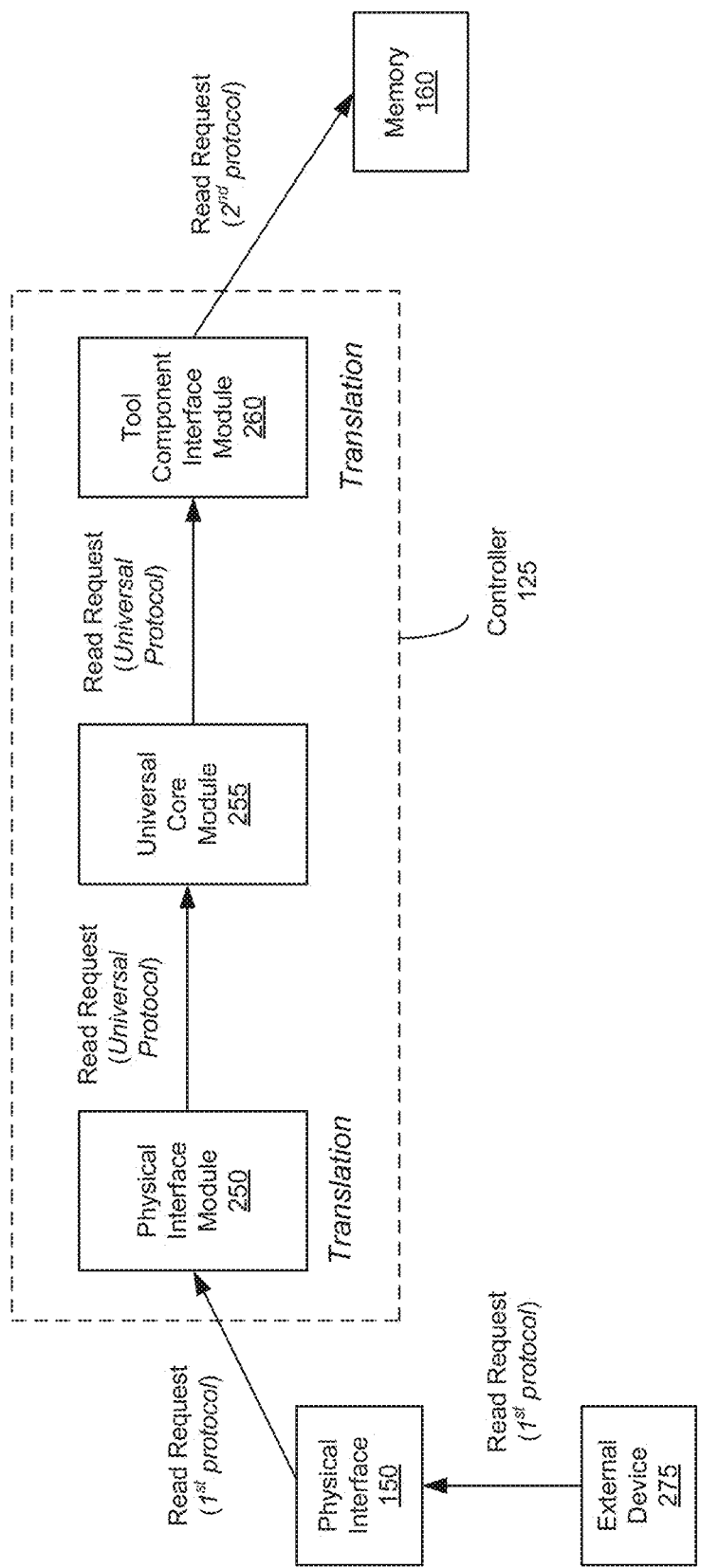
FIGS. 5A-B illustrate exemplary communication flows between an external device and a tool component according to the universal protocol.
Figure 5B:
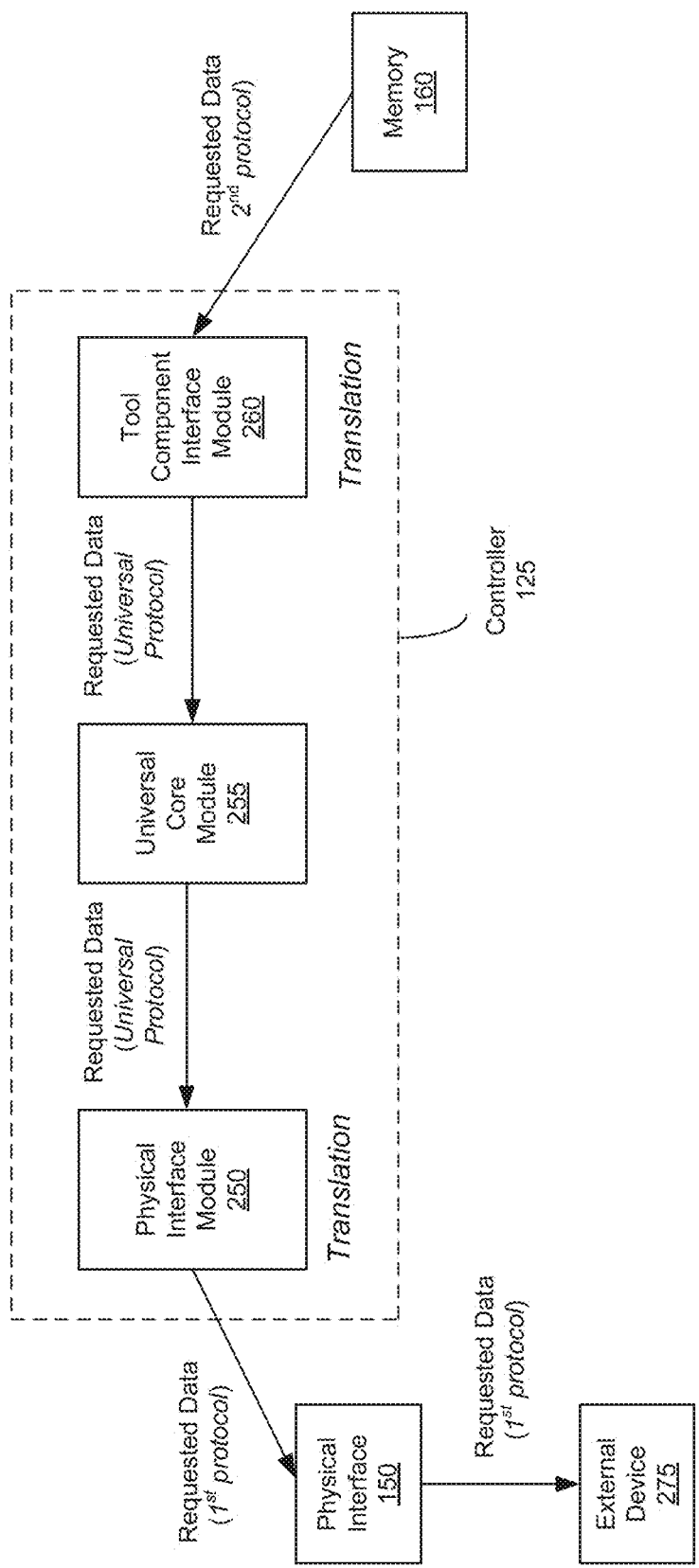

FIGS. 5A-B illustrate exemplary communication flows between an external device 275 and one of the tool components 265, such as the memory 160. The example of FIGS. 5A-B will be described as a read of the memory 160 of the tool 100 by the external device 275; however, the communications from the external device 275 may be for other reasons as well, such as memory writes, sensor reads, firmware updates, troubleshooting, etc.

As shown in FIG. 5A, the external device 275, such as a smart phone, laptop, handheld fob device, another power tool, or an accessory, communicates a read request with the goal of receiving the performance data log 215 of the memory 160. The read request is communicated in a first protocol, such as a wireless protocol, via the physical interface 150, to the controller 125. The controller 125, via the physical interface software 250, translates the read request from the first protocol to the universal protocol. After the translation, the controller 125, via the universal core software 255, interprets and handles the translated read request according to a set of rules of the universal core software 255. For instance, the read request may include an identifier and security element (e.g., a password) of the requesting external device 275 and the controller 125 may verify that the external device 275 is authorized to request the read. The controller 125 may also respond to the external device 275 with an acknowledge message, which is translated by the physical interface software 250 from the universal protocol to the first protocol on route to the external device 275. After verification, the controller 125 translates the read request in the universal protocol to a second protocol via the tool component interface software 260. The second protocol is the protocol used to communicate with the memory 160.

Turning to FIG. 5B, the memory 160 has received the read request in the second protocol and responds by outputting the requested data back to the controller 125 according to the second protocol. The controller 125, via tool component interface software 260, translates the data to the universal protocol. The controller 125, via the universal core software 255, handles the data according to rules, and provides the data in the universal protocol to the physical interface software 250. The controller 125 then translates, via the physical interface software 250, the data to the first protocol. The controller 125 outputs the data in the first protocol, via the physical interface 150, to the external device 275 that originally provided the read request.

Although the physical interface software 250 and tool component interface software 260 are described as software stored in memory 160 and executed by the controller 125, each may be implemented in part or wholly in hardware of the controller 125 or outside of the controller 125. For example, the physical interface software 250 and/or the tool component interface software 260 may be implemented by one or more separate digital signal processors (DSPs) or general purpose processors executing the physical interface software 250 and/or tool component interface software 260, or by one or more field programmable gate arrays (FPGAs) or application specific integrated circuits (ASICs). Use of the term "module" rather than "software," (e.g., the physical interface module), refers to implementations in which software is executed by the controller 125 as described above, implementations in which the software is executed by another processing device (e.g., a DSP) separate from the controller 125, and implementations in which the module is implemented in whole or in part by hardware (e.g., with an FPGA or ASIC).

Although the interface software 200 is described above as being executed on a power tool 100, embodiments of the invention include versions of the interface software 200 loaded on other types of tools and accessories. For instance, versions of the interface software 200 may be loaded and executed on battery packs, battery chargers, other power tools, test and measurement equipment, vacuum cleaners, work site radios, outdoor power equipment, and vehicles. Other power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Battery chargers can include wall chargers, multi-port chargers, travel chargers, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. The battery pack can also be attachable to and detachable from devices such as electronic key boxes, calculators, cellular phones, head phones, cameras, motion sensing alarms, flashlights, worklights, weather information display devices, a portable power source, a digital camera, a digital music player, a radio, and multi-purpose cutters.

Additionally, the power tool 100 and other types of tools and accessories may be powered by different power platforms. For instance, the various tools and accessories may be powered by one of an AC source (e.g., 120 V, 60 Hz) via a power cord, or a DC source (e.g., 4-V battery pack, 12-V battery pack, 18-V battery pack, 28-V battery pack, 36-V battery pack, 40-V battery pack, etc.). The DC battery packs include a housing within which are one or more battery cells, which may be lithium ion ("Li-ion") cells, Nickel-Cadmium ("Ni-Cad") cells, or cells of another chemistry type.

Across the various tools and accessories having various power platforms, the interface software 200 includes the same universal core software 255. For instance, a hammer drill powered by a 28-V battery pack, an impact driver powered by an 18-V battery pack, a thermal imager powered by a 12-V battery pack, and screwdriver powered by a 4-V battery pack all include the same universal core software 255. However, the physical interface software 250 and tool component interface software 260 are customized for a particular tool or accessory. For example, if the tool 100 includes the wireless antenna 140, but not the I/O port 145, the physical interface software 250 may include only the software for translating communications between a first protocol used with the wireless antenna 140 and the universal protocol, but not the software for translating a second protocol used with the I/O port 145 and the universal protocol. Moreover, if the tool 100 includes the memory 160 and a particular temperature sensor as one of the sensors 170, the tool component interface software 260 can be customized to translate communications between the universal protocol and those particular tool components 265. Having the universal core software 255 consistent across various tools and accessories reduces development costs and simplifies communications across the various tools and accessories, troubleshooting, and data logging, and provides other benefits. Rather than development and maintaining software for each separate tool and accessory, a single universal core module is installed on the various tools and accessories, and (generally) the only customization is for the translation modules used to interface with the universal core.

Additionally, in some embodiments, generic physical interface modules 250 and/or tool component interface modules 260 are generated and installed. The generic modules have the ability to translate between various protocols and the universal protocol, such that the generic modules are able to be installed on various tool types, including those that have different protocol needs. For instance, a generic physical interface module 250 may include the ability to translate communications for a wireless protocol and an I/O port protocol, and this generic physical interface module 250 may be installed on (a) a first tool that uses the wireless protocol, but not the I/O port protocol, (b) a second tool that uses the I/O port protocol, but not the wireless protocol, and (c) a third tool that uses both the wireless protocol and the I/O port protocol.

Figure 6:
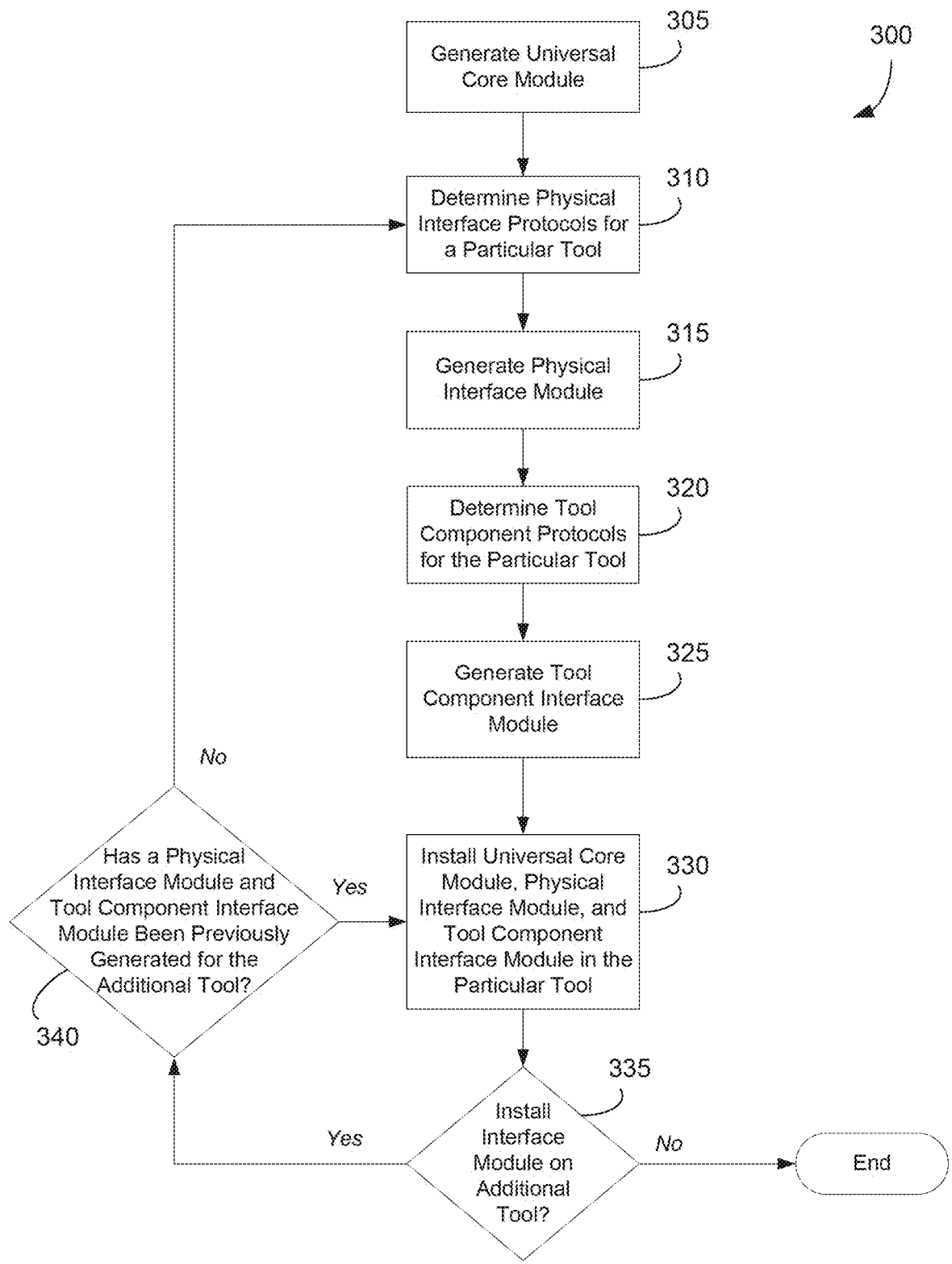
FIG. 6 illustrates a method of implementing a universal core module on a plurality of various tools and accessories.

FIG. 6 illustrates a method 300 of implementing a universal core on a plurality of various tools and accessories. In step 305, the universal core module 255, including the set of rules for handling communications between tool components and external devices, is generated. Generation may include writing code in a first programming language and compiling the code into machine code executable by the controller 125. In some instances, the generation may include a combination of hardware and software design, or may include solely hardware design.

In step 310, the physical interface of a particular tool or accessory is determined, including the particular protocols used by the physical interface. For instance, with respect to the power tool 100 as shown in FIG. 2, in step 310, the physical interface 150 is determined to include the power block 130, the wireless antenna 140, and the I/O port 145. Additionally, the particular protocols of the power block 130, the wireless antenna 140, and the I/O port 145 are determined. In step 315, the physical interface module 250 is generated based on the determinations of step 310. For example, the physical interface module 250 is generated to enable the translation of the particular protocols used by the physical interface 150 to the universal core protocol, and the translation of the universal core protocol to the particular protocols used by the physical interface 150. The generation of the physical interface module 250 may include hardware design, software design, or a combination thereof, similar to the generation of the universal core module 255.

In step 320, the components of the particular tool or accessory, including the particular protocols used by the components, are determined. For instance, with respect to the power tool 100 as shown in FIG. 2, in step 320, the tool components 265 are determined to include the memory 160, the motor drive 165, the sensors 170, and the user output 175. Additionally, the particular protocols of the memory 160, the motor drive 165, the sensors 170, and the user output 175 are determined in step 320. In step 325, the tool component interface module 260 is generated based on the determinations of step 320. For example, the tool component interface module 260 is generated to enable the translation of the particular protocols used by the tool components 265 to the universal core protocol, and the translation of the universal core protocol to the particular protocols used by the tool components 265. The generation of the tool component interface module 260 may include hardware design, software design, or a combination thereof, similar to the generation of the universal core module 255.

In step 330, the generated universal core module 255, physical interface module 250, and tool component interface module 260 are installed in the particular tool. For instance, in the case of the tool 100 and wherein the generated universal core module 255, physical interface module 250, and the tool component interface module 260 are software, installation includes loading the modules into the memory 160. For instance, as shown in FIG. 2, the memory 160 may include a power port and a read/write (r/w) port for reading and writing to the memory 160 (e.g., to install software). The r/w port of the memory 160 and the connection shown coupling the memory 160 and controller 125, although shown as separate ports in FIG. 2, may be implemented as a combined communication port. To install software initially into the memory 160, while power (e.g., 3.3 VDC) is applied to the power port, a write command and the software to be installed may be transmitted to the memory 160 over the r/w port. At the end of step 330, the memory 160 of the power tool 100 has stored thereon the interface software 200 as shown in FIG. 3.

Thereafter, the interface software 200 may be used to install the application software 205 and/or parameters 210 on the memory 160. For instance, an external device may communicate the application software 205 and/or parameters 210 to the universal core software 255 along with commands to initially load the application software 205 and/or parameters 210 onto the memory 160. The installation of the application software 205 and/or parameters 210 may occur at a different stage of manufacture of the tool 100 and/or at a different facility. For instance, the tool may be purchased without the application software 205 and/or parameters 210, and then the purchasing entity may install the application software 205 and parameters 210, which may be custom to the purchasing entity. Alternatively, in step 330, the application software 205 and/or parameters 210 may also be installed in the memory 160.

In the case of one or more of the universal core module 255, physical interface module 250, and tool component interface module 260 being implemented at least in part in hardware, the installation of such modules may also include mounting the various hardware components to a PCB that resides within the particular tool. Mounting may include making conductive connections between the hardware and the other components of the particular tool.

If in step 335, an additional tool or accessory is determined to require installation of the interface module 200, the method 300 proceeds to step 340. In step 340, it is determined whether the additional tool or accessory has the same physical interface and tool components as a tool for which a physical interface module 250 and tool component interface module 260 was previously generated. If so, the method proceeds to step 330 and the previously generated universal core module 255, physical interface module 250, and tool component interface module 260 are installed. Additionally, although not explicitly shown in FIG. 6, if the additional tool or accessory has the same physical interface, but unique tool component protocols (or vice versa), relative to a particular tool previously handled according to steps 305-325, the previously generated physical interface module 25 (or tool component interface module 260, as the case may be) may be re-used and installed on the additional tool. The other of the tool component interface module 260 and the physical interface module 250 may then be generated and installed on the additional tool or accessory.

If in step 340, however, the additional tool or accessory is determined to not have had the physical interface module 250 and tool component interface module 260 previously generated, the method returns to step 310. The steps 310 through 330 are repeated for the additional tool or accessory to produce a customized physical interface module 250 and tool component interface module 260; however, since the universal core module 255 is consistent across various tools, the universal core module 255 does not need to be re-generated or customized for the additional tool or accessory. Rather, the same universal core module 255 generated for the first particular tool is re-used with the additional tool.

The steps in the method 300 may be executed in an order different than the order shown in FIG. 6. For instance, the physical interface modules and tool component interface modules may be generated for various tools (steps 305-325), and then installed at a later point. Additionally, the universal core module, physical interface module, and tool component interface module may be generated in a different order.

Figure 7:
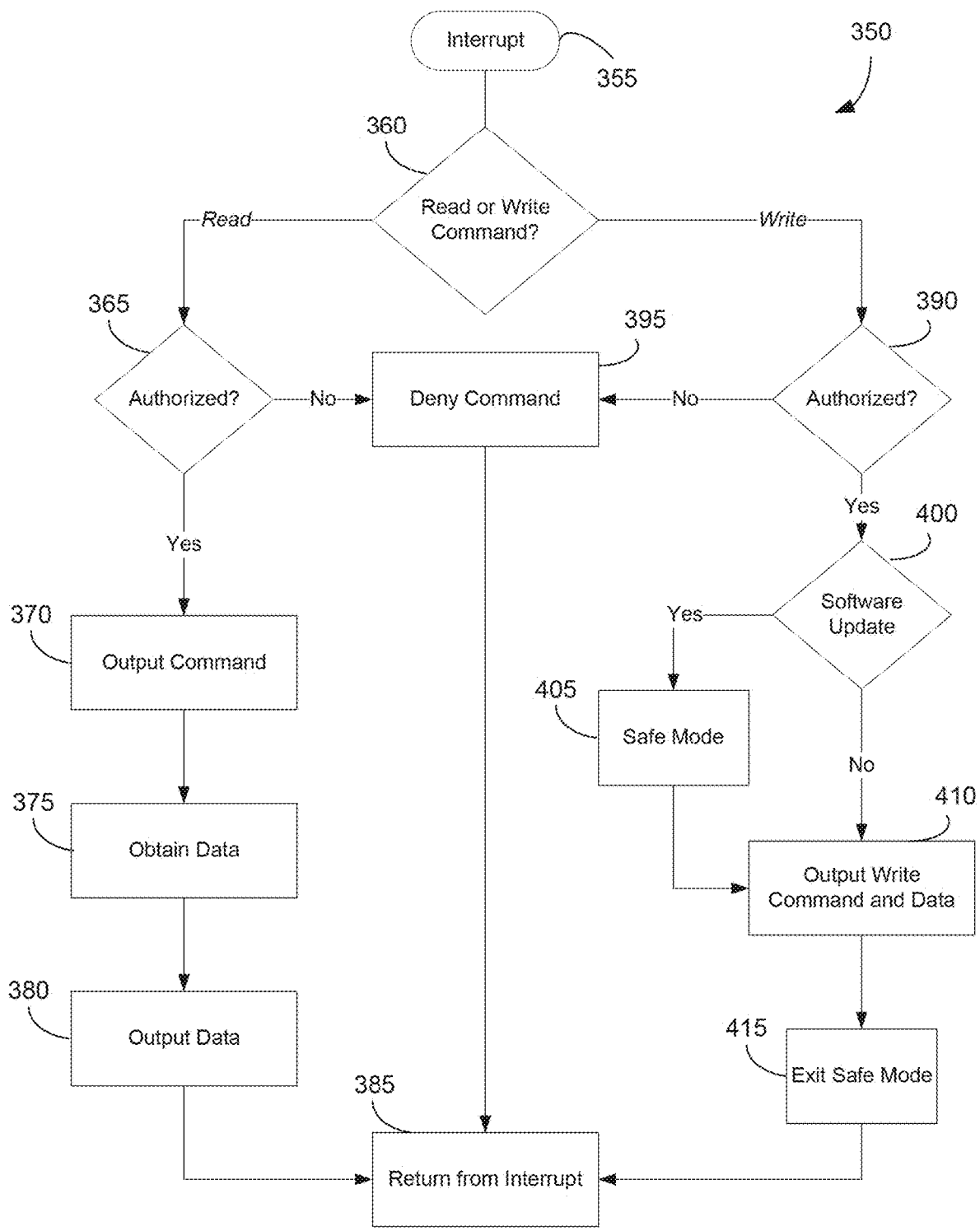
FIG. 7 illustrates a method for implementing an exemplary rule set of the universal core module.

FIG. 7 illustrates a method 350 that implements an exemplary rule set of the universal core module 255. Method 350 is entered into upon an interrupt 355. The interrupt, which may be a software interrupt or a hardware interrupt, causes the controller 125 to jump to a particular line of code in the memory 160, such as a line in the interface software 200, that includes instructions for handling the interrupt (i.e., an interrupt handler). As illustrated, the interrupt 355 is assumed to be an interrupt generated due to receipt of a command from the external device 275 (see FIGS. 5A-B). For instance, the external device 275 may send an interrupt signal, or a command without an interrupt signal, which causes the physical interface 150 to activate (e.g., pull up or pull down) an interrupt pin of the controller 125. Once the interrupt pin is activated, the controller 125 jumps to the particular line of code in the memory 160 to handle the interrupt. Alternatively, a software interrupt may be generated at regular intervals during execution of the application software 205, or a hardware interrupt may be generated at regular intervals through activation of the interrupt pin of the controller 125, at which point the method 350 is initiated.

In step 360, the universal core module 255 determines whether the command received was a read or write command. In the example, the command has been translated before step 360, either before or after the interrupt 355 occurred, depending on the particular interface module 200 design. Upon determining that a read command was received, the universal core module 255 proceeds to step 365 to determine whether the command is authorized. For instance, the read command may include an identifier and security element (e.g., a password) of the requesting external device 275 and the universal core module 255 may verify that the external device 275 is authorized to request the read. After verification, in step 370, the universal core module 255 outputs the read command to the tool component interface module 260 according to the universal protocol. The tool component interface module 260 then proceeds to translate the read command to the appropriate protocol and outputs the request to the appropriate tool component. In some instances, the controller 125 is coupled to the tool components 265 via one or more busses, and the read command includes an address that specifies a particular tool component, and a potentially a particular portion thereof, to be read. For instance, the motor drive 165, sensors 170, and user output 175 may be memory-mapped such that a read command with an address may specify any of the motor drive 165, a sensor of the sensors 170, a user output 175, or a section of the memory 160.

The addressed tool component provides data back to the controller 125 in response to the read command, and, in step 375, the universal core module 255 receives the data, which was translated to the universal protocol by the tool component interface module 260. In step 380, the universal core module 255 outputs the data obtained in step 375 to the physical interface module 250. Thereafter, the physical interface module 250 outputs the data to the external device 275 according to the protocol of the external device 275. After step 380, the universal core module 255 exits the interrupt handler (i.e., returns from the interrupt) in step 385.

Upon determining that a write command was received, the universal core module 255 proceeds to step 390 to determine whether the command is authorized. For instance, the write command may include an identifier and security element (e.g., a password) of the requesting external device 275 and the universal core module 255 may verify that the external device 275 is authorized to request the write. If the command cannot be authorized, the universal core module 255 proceeds to provide a denial message to the requesting device in step 395 and exit the interrupt handler in step 385. After verification, in step 400, the universal core software 255 determines whether the command necessitates that the tool 100 enter a safe mode. In a safe mode, various functions of the tool 100 are disabled, such as the ability for the motor 180 to rotate. For example, if the command directs the controller 125 to install, reinstall, or update the application software 205 and/or parameters 210 (i.e., a firmware install/update), the universal core software 255 determines in step 400 to enter the safe mode (step 405). Accordingly, in the safe mode, depression of the trigger of the tool 100 will not result in motor 180 rotating. Without a safe mode, operation of the tool 100 may be unpredictable, as the software for controlling the tool 100 may be temporarily corrupted while it is being overwritten. Although not illustrated in FIG. 7, a safe mode may also be entered when handling read commands or other commands.

After entering the safe mode, or after determining that the safe mode is not required, the universal core module 255 proceeds to step 410 to output the write command and data to the tool component interface module 260. The tool component interface module 260 then proceeds to translate the write command from the universal protocol to the appropriate protocol and outputs the request to the appropriate tool component. In some instances, the controller 125 is coupled to the tool components 265 via one or more busses, and the write command includes an address that specifies a particular tool component or, potentially, a particular portion thereof, for which the write command is intended. In the case of a firmware update, the write command may specify and address of the memory 160 where the new firmware associated with the write command is to be stored. Such a firmware update may include several write commands to overwrite or add the firmware to the memory 160. Accordingly, step 410 may loop several times until the firmware has been stored in the memory 160. Similarly, the steps 370, 375, and 380 for handling a read command may be looped to complete a read operation, particular when larger sections of data are being requested. After completing the write command, if the safe mode was previously entered, the universal core module 255 exits the safe mode in step 415 and proceeds to step 385 to return from the interrupt. If the safe mode was not entered, the universal core module 255 may bypass step 415 and proceed to step 385 to return from the interrupt.

As noted above, the motor drive 165, sensors 170, and user output 175 may be memory-mapped such that a write command with an address may specify any of the motor drive 165, a sensor of the sensors 170, a user output 175, or a section of the memory 160. Accordingly, such a write command may be used to control a tool component 265 to operate in a particular way, rather than to store data or instructions for later retrieval. For instance, a particular write command or several write commands to the motor drive 165 may cause activation of the motor drive 165 such that the motor 180 rotates, or may cause deactivation of the motor drive 165 such that the motor 108 is disabled or placed in a sub-optimal performance mode. Additionally, a write command to a light of the user output 175 may cause the light to be illuminated or disabled. Alternatively, rather than memory-mapped components addressable over a bus, the controller 125 may have dedicated or semi-dedicated pins and connections to communicate with one or more of the various tool components 265.

The method 350 presupposes one of two commands, a read or write. However, in some embodiments, the universal core module 255 handles additional commands ("other commands"), including more complex commands, such as conditional instructions, multiple-read or multiple write commands, illumination commands (e.g., to enable or disable a light of the user output 175), audible commands (e.g., to cause a speaker of the user output 175 to generate sound), or motor drive commands (e.g., to cause the motor 180 to operate), etc. Similar to the read and write commands, the other commands are handled by the universal core module 255, potentially in a safe mode.

Additionally, although not illustrated in FIG. 7, in instances where the interrupt 355 occurs and no command is received (e.g., after a periodic interrupt), the method 350 exits the interrupt handler in step 385 and returns to normal operation.

In some instances, internal tool components may generate an interrupt and provide one or more commands to the universal core module 255. For instance, at regularly timed intervals, or upon an error condition, the motor drive 165 or sensors 170 may generate a hardware interrupt and provide a command to the universal core module 255. In response, the controller 125 may write performance data for the sensors 170 or motor drive 165 to the data log 215, may initiate communication with the external device 275 to report conditions of the sensors 170 or motor drive 165, or take another action.

In some embodiments, a software loop executed by the controller 125 during normal operation of the tool 100 includes a non-interrupt-based, periodic check to determine whether any commands have been received from the physical interface 150 or tool components 265, rather than or in addition to an interrupt-based approach as described above. The code for performing the check resides, for instance, in a software loop of the interface software 200, of the application software 205, or a combination thereof.

Thus, the invention provides, among other things, a universal protocol for use with power tools and other devices. Various features and advantages of the invention are set forth in the following claims.

What is claimed is:

1. A system for communicating messages between power tools, the system comprising:
 a first power tool including a first communication interface configured to transmit a message, the first power tool powered via a first power platform;
 a first controller coupled to the first communication interface and executing a universal core module;

a second power tool including a second communication interface configured to receive the message, the second power tool powered via a second power platform different from the first power platform; and a second controller coupled to the second communication interface and executing the universal core module, the second controller configured to
receive the message,
translate the message using the universal core module, and
operate the second power tool based on the message.

2. The system of claim 1, wherein the first power platform includes one of an alternating current (AC) power source and a direct current (DC) power source.

3. The system of claim 1, wherein the second power platform includes one of an alternating current (AC) power source and a direct current (DC) power source.

4. The system of claim 1, wherein the first power platform and the second power platform include two selected from a group of a 4 volt battery pack, a 12 volt battery pack, an 18 volt battery pack, a 28 battery pack, and a 36 voltage battery pack.

5. The system of claim 1, wherein the first communication interface is a wireless interface.

6. The system of claim 1, wherein the message includes an identifier and a security element, wherein the second controller is further configured to verify the first power tool is authorized to issue the message by processing the identifier and security element.

7. The system of claim 1, wherein the message includes an instruction to activate a tool component of the second power tool.

8. The system of claim 7, wherein the tool component is a motor.

9. The system of claim 1, wherein the message includes an instruction to disable a tool component of the second power tool.

10. The system of claim 9, wherein tool component is a motor.

11. The system of claim 1, wherein the second controller is configured to operate the second power tool based on the message by performing at least one selected from a group consisting of providing visual feedback via a light emitting diode, provide audio feedback via a speaker, and providing tactile feedback via a vibrator.

12. The system of claim 1, wherein the message includes a request for data of the second power tool.

13. The system of claim 1, wherein the second controller is configured to operate the second power tool based on the message by transmitting a second message translated via the universal core module.

14. A method for communicating messages between power tools, the method comprising:
establishing a communication link between a first power tool and a second power tool, the first power tool powered via a first power platform and the second power tool powered via a second power platform different from the first power platform;
receiving, at the first power tool from the second power tool, a message over the communication link;
translating, by a controller of the first power tool executing a universal core module, the message to a format usable by the first power tool; and
operating a motor of the first power tool based on the message.

15. The method of claim 14, wherein operating the first power tool based on the message includes transmitting a second message, translated via the universal core module, to the second power tool over the communication link, the second power tool including a second controller configured to execute the universal core module to translate the second message.

16. The method of claim 14, wherein translating the message to a format usable by the first power tool includes:
translating the message from a first protocol to a universal protocol; and
translating the message in the universal protocol to a second protocol usable by the motor of the first power tool.

17. The method of claim 14, wherein the first power platform includes one of an alternating current (AC) power source and a direct current (DC) power source.

18. The method of claim 14, wherein the second power platform includes one of an alternating current (AC) power source and a direct current (DC) power source.

19. The method of claim 14, wherein the first power platform and the second power platform include two selected from a group of a 4 volt battery pack, a 12 volt battery pack, an 18 volt battery pack, a 28 battery pack, and a 36 voltage battery pack.

20. The method of claim 14, wherein the message includes an instruction to at least one of activate and disable the motor of the first power tool.

* * * * *